Oct. 14, 1958 — J. W. LENNON — 2,856,089
MEANS FOR ENCASING EGGS
Filed May 31, 1952 — 2 Sheets-Sheet 1

INVENTOR
James Warren Lennon
BY Robert M. Dunning
ATTORNEY

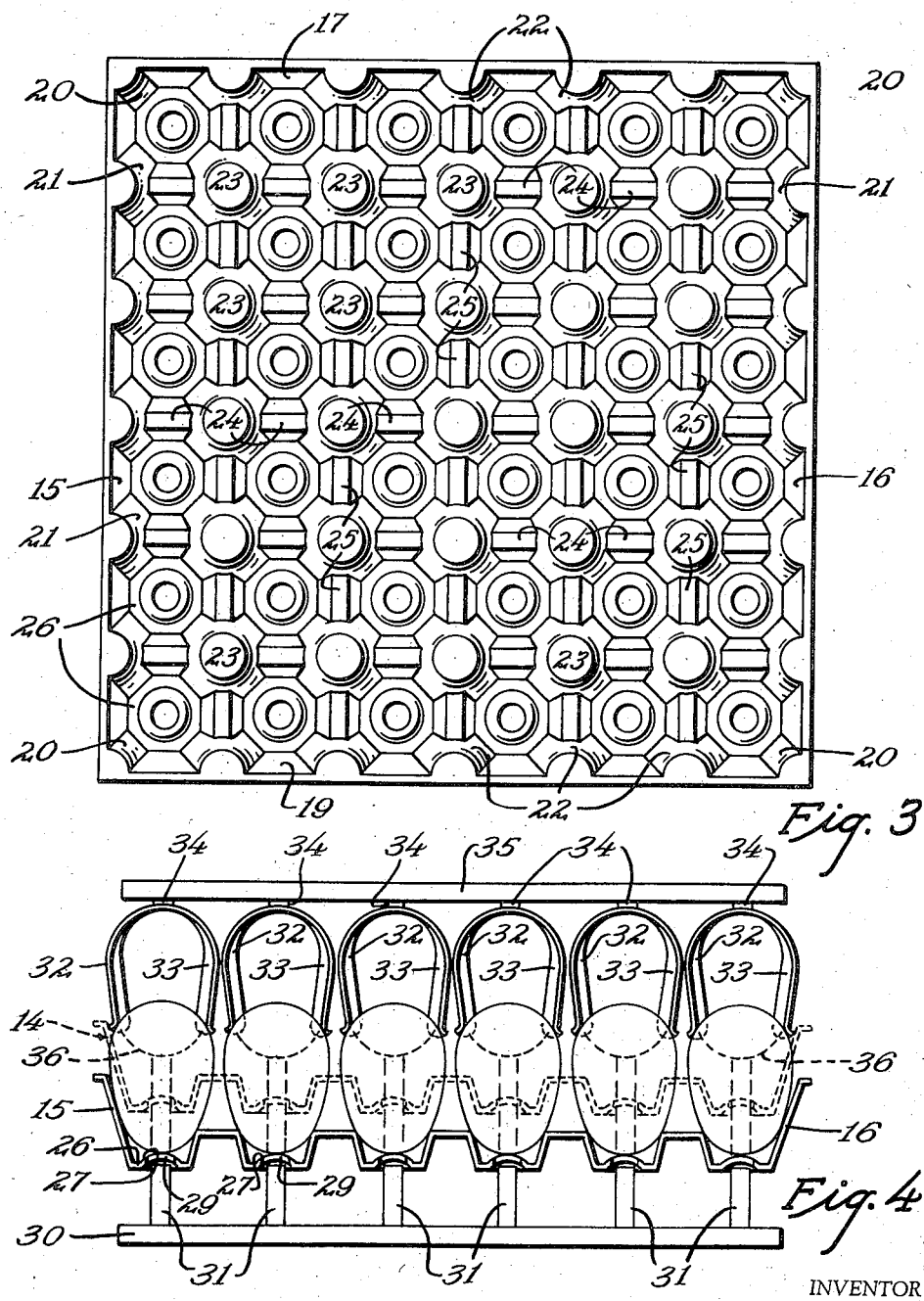

United States Patent Office 2,856,089
Patented Oct. 14, 1958

2,856,089
MEANS FOR ENCASING EGGS

James Warren Lennon, St. Paul, Minn., assignor of one-half to Paul A. Schilling, St. Paul, Minn.

Application May 31, 1952, Serial No. 291,000

4 Claims. (Cl. 214—310)

My invention relates to an improvement in means for encasing eggs in a standard egg case in individual pockets, which means is capable of protecting the eggs during shipment to either the wholesale or retail trade.

Egg protecting means of various types have been employed for protecting eggs encased within an egg case during shipment, transportation, and storage. The most common means comprises a series of egg flats having cellular fillers therebetween. However, pocketed trays of molded pulp have also been employed for cushioning the eggs while in the case. These pocketed trays are extremely effective in preventing the eggs from breaking but have the usual disadvantage of clamping the eggs with a wedging action so that they are hard to remove from the trays. It is this disadvantage which the present invention is designed to eliminate.

A feature of the present invention resides in the provision of a series of pocketed trays which are designed to be contained in an egg case to support and cushion the eggs therein. Each layer of eggs is encased within an upright tray section and is enclosed by an inverted tray section which fits over the eggs in a manner to enclose the same. The upper tray sections can usually be removed from the lower tray sections and the eggs contained therein with little or no difficulty. However, the eggs tend to wedge within the lower tray section in such a manner that they usually can not be removed therefrom by egg lifters of conventional type which are capable of lifting one or more dozens of eggs simultaneously. The lower tray sections include means whereby the eggs may be readily removed therefrom.

Eggs are usually shipped in egg cases with the smaller diameter end thereof pointed downwardly. This smaller diameter end is not as rounded as the large diameter end and the tapered eggs wedge between the walls of the tray pockets. The pockets are preferably formed by posts which extend the full depth of the tray section to furnish continuous support between the various layers of trays. This difficulty is aggravated by variations in the sizes of the eggs. The present invention deals with a means of engaging the lower ends of the eggs while they are held in the lower tray section so as to assist in removing the eggs from this lower tray section.

A feature of the present invention resides in the provision of an egg encasing tray structure including a lower tray section having apertures therein at the lower end of each egg pocket or cell. When it is desired to remove the eggs from the lower tray section, means are inserted through the lower end of the tray to push against the eggs therein and to force them from their cells or pockets.

A feature of the present invention resides in the provision of a means capable of removing a considerable number of eggs from a cellular tray simultaneously. A series of projections are provided which may be inserted through the openings in a series of cells simultaneously to engage against the lower ends of the eggs. By raising the projections relative to the tray, or by lowering the tray upon the projections, the eggs are urged upwardly simultaneously from the lower tray section.

A feature of the present invention lies in the fact that the egg removing members may be used in conjunction with an egg lifter designed to resiliently engage the eggs. The egg lifter may be of a type which extends between the rows of eggs and moves laterally to engage the eggs beneath the portions of largest diameter thereof or may be of a type including spring fingers which frictionally engage about the eggs by relative vertical movement between the egg tray, the egg lifter and the projections for raising the eggs from the base of the tray. The eggs may be quickly and easily released from the tray and engaged by the lifter.

These and other objects and novel features of my invention will be more clearly and fully set forth in the following specification and claims.

In the drawings forming a part of my specification:

Figure 3 is a top plan view of the bottom tray section showing the general arrangement of the parts therein.

Figure 4 is a diagrammatic view showing a series of eggs in the lower tray section, a series of projections for lifting the eggs out of the tray section, and an egg lifter for engaging the eggs to remove the eggs from the tray.

Figure 1:
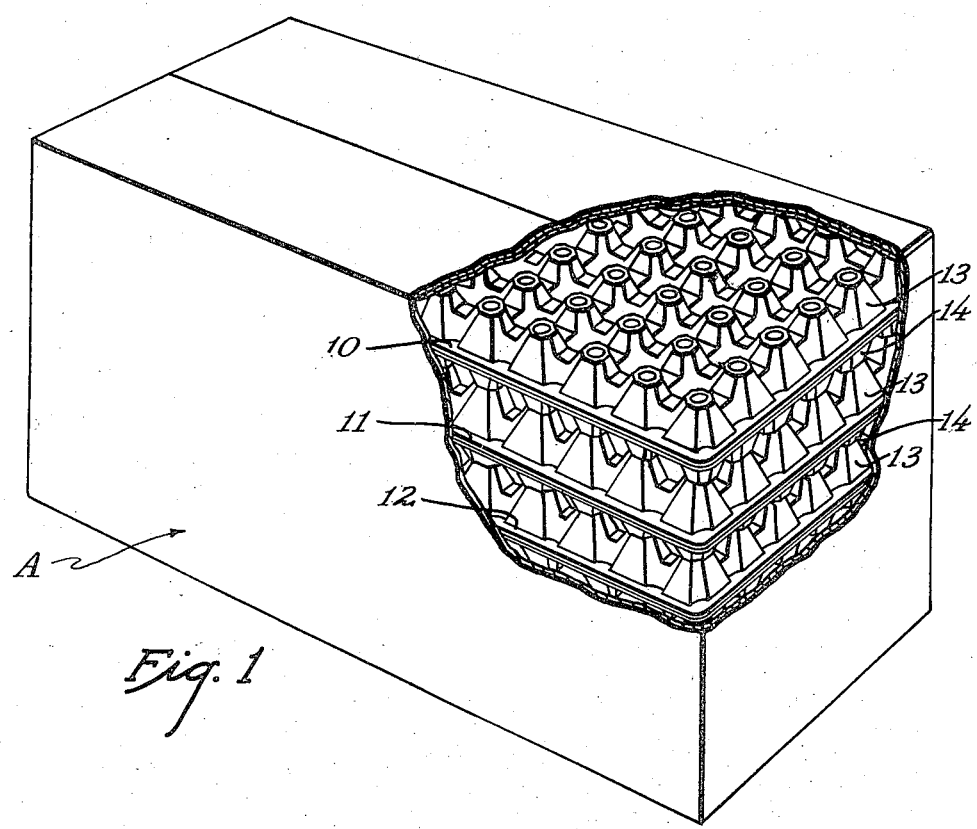
Figure 1 is a perspective view of an egg case, a portion of which has been broken away to show a series of egg encasing trays therein.
Figure 2:
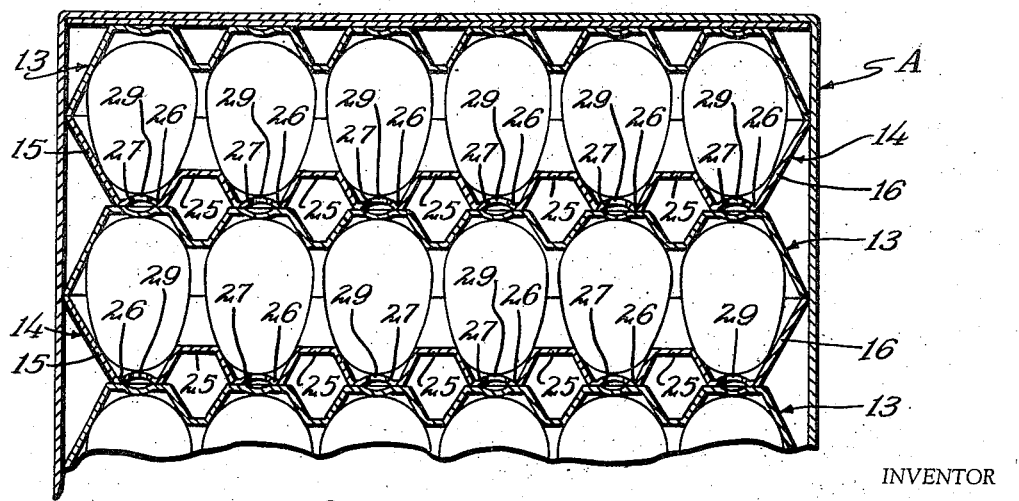
Figure 2 is a cross sectional view through the case and through two layers of egg encasing trays.

The egg case is illustrated in general by the letter A and may be of any suitable form or construction. In the form illustrated, the case A comprises a rectangular container designed to accommodate two laterally spaced series of egg containing trays. In usual form each end of the egg case is designed to contain fifteen dozen eggs arranged in five layers with three dozen eggs in each layer. Accordingly in the form of construction shown the tray sections each include thirty-six pockets or cells for the accommodation of an equal number of eggs. Three layers of egg encasing means are illustrated in Figure 1, these layers being indicated in general by the numerals 10, 11 and 12. Each layer includes two tray sections including an upper section 13 and a lower section 14. The lower section 14 is upright and the upper section is inverted thereupon so as to enclose the eggs between the sections.

The upper and lower tray sections are generally similar in form, although the pockets of the upper section are preferably larger than those of the lower tray section in view of the fact that the inverted upper tray section is designed to enclose the larger diameter ends of the eggs. However, in other material respects, the two trays are generally similar in shape and form.

Each tray section, such as the section 14, illustrated in Figure 3 of the drawings, includes downwardly and inwardly sloping end walls 15 and 16 and inwardly and downwardly sloping side walls 17 and 19. The sloping walls 15 and 16 are connected at the corners to the side walls 17 and 19 by inwardly rounded projections 20. Each of the end walls is divided into parts by a series of generally frusto-conical posts or projections 21 which terminate at their upper extremity flush with the upper surface of the end walls. The side walls 17 and 19 are similarly broken up by a series of rounded inwardly projecting posts or projections 22 which are partially frusto-conical in form. The posts 21 and 22 are evenly spaced along their respective walls. The tray is further divided by a series of upwardly projecting posts 23 which are longitudinally aligned between the posts or projections 21 on the end walls 15 and 16 and are similarly laterally aligned with the posts or projections 22 of the side walls 17 and 19. These posts 23 combine with the posts or projections 21 and 22 to provide a series or regularly spaced pockets or cells.

The posts 21 are connected to the aligned posts 23 and the longitudinally aligned posts 23 are connected by partition walls 24 which join the various posts midway between the upper and lower surfaces thereof. The posts 22 and the posts 23 with which they are laterally aligned, as well as the laterally aligned spaced posts 23, are interconnected by partition walls 25 which join the posts 22 and 23 between their upper and lower ends. These partition walls 24 and 25, thus form partial height walls connecting the posts of each cell and assist in forming the pockets or cells into which the eggs are inserted.

The bottom of each cell 26 is provided with an upwardly projected hump 27. This hump 27 is designed to engage against the lower surface of the egg and the material is sufficiently flexible so that the hump may be inverted by an unusually long egg. Each of the humps 27 is provided with a central aperture 29 therethrough. These apertures 29 form an important part of the present invention.

In Figure 4 of the drawings I disclose an egg ejecting apparatus which may be used to assist in removing the eggs from the various pockets. Eggs vary greatly in shape and form and some of the eggs have a tendency to become wedged between the separating posts of the tray in such a way that they can not be readily removed from the tray by the usual egg lifting devices. This difficulty is accentuated in a tray of the type disclosed as the dividing posts extend flush with the upper surface of the tray so that at least one-half of the length of the egg is enclosed in the bottom tray section.

The egg removing device includes a base 30 having a series of projecting posts or pegs 31 extending upwardly therefrom. These posts 31 are arranged in longitudinally and laterally arranged rows and may correspond in number to the cells 26 and are properly spaced to extend through the apertures 29 at the bottom of the cells. If it is preferred to remove a smaller number of eggs simultaneously from the tray, the pegs 31 are correspondingly reduced in number.

If the tray 14 is inserted over the posts 31 so that the posts are aligned with the apertures 29 relative movement between the tray and removing apparatus may be employed to urge the eggs upwardly relative to the tray. The distance of movement of the eggs may be varied, but ordinarily it is necessary to move the eggs but a short distance in order to release them from the cells which they occupy.

In Figure 4 of the drawings I also disclose an egg lifting apparatus. This lifting apparatus may be of any suitable shape or form and is shown as including spaced spring fingers 32 and 33 which are designed to engage opposite sides of each egg. These spring fingers may engage at various points about the periphery of the egg and are designed to extend below the point of greatest diameter of the eggs so as to properly support the same. Each set of spring fingers is centrally connected at 34 to a common support 35 by means of which all of the spring devices may be simultaneously raised and lowered.

In the insertion and removal of the eggs the various parts move relatively to one another and it is possible to either lower the tray over the projections 31 or to raise the projections 31 upwardly beneath the fixed tray. In Figure 4 I disclose in dotted outline the tray 14 in an elevated position. In the dotted outline position of the tray 14 the spring fingers 32 and 33 are engaging the upper portions of the eggs, but do not extend far enough down on all of the eggs to insure a firm grip thereupon. However, if the projections 31 are inserted through the apertures 29 when the tray is in the dotted outline position the eggs may be raised from their individual cells into the spring lifting arms. The eggs 36 are shown in dotted outline in this elevated position.

The egg lifting apparatus illustrated is merely for the purpose of illustration and other types of egg lifting devices could be substituted therefor. Certain such lifting devices include wire rods which may be vertically aligned to pass between the rows of eggs. Certain of the wires may then be moved laterally so as to extend beneath the eggs and to prevent the eggs from dropping. With this sort of arrangement it is necessary to elevate the eggs at least partially from the pockets in order that the lowermost wires may pass beneath the eggs to support the same. Obviously such a lifter may be employed with my tray construction if the eggs are raised by the members 31.

The tray construction illustrated is also advantageous in candling the eggs. By elevating certain of the eggs they may be easily candled and either returned to the cells or removed therefrom. The members 31 may thus be used to elevate the eggs for candling purposes as well as for lifting them from the tray.

In accordance with the patent statutes, I have described the principles of construction and operation of my means for encasing eggs, and while I have endeavored to set forth the best embodiment thereof, I desire to have it understood that obvious changes may be made within the scope of the following claims without departing from the spirit of my invention.

I claim:

1. An egg containing and elevating device including a cellular tray, said tray having a series of cells therein formed by cellular pockets, said pockets being provided with integral flexible base portions formed as depressible inwardly shaped humps having an aperture therethrough and a series of members spaced similarly to said apertures and movable through said apertures against eggs contained in said cells for elevating the eggs relative to the cells.

2. In the combination of an egg container within which eggs are packed with their shells clamped by the edges of a series of egg holding cups, an elevating device for simultaneously removing a plurality of eggs therefrom comprising an arrangement including a cellular tray provided with a series of egg retaining and holding cups formed as integral cellular pockets the sides of which clamp the eggs on the tray and the bases of which are provided with apertures, a series of upwardly projecting pegs for alignment with said apertures and for releasing the clamping action by said cellular pockets on said egg shells, a support for said pegs, a series of resiliently expandable egg lifters in alignment with said upwardly projecting pegs, and a support for said egg lifters.

3. In combination, an egg holding tray having a series of egg receiving pockets therein, said pockets having apertures therethrough at the bases thereof and having sloping walls which clamp the eggs with a wedging action, a series of upwardly projecting members registrable with said receiving pockets and extendable through said apertures to engage against the eggs therein and unwedge the same, and a series of egg lifters including egg supporting pockets registrable with said receiving pockets when in position overlying said tray, said egg lifters and said tray being simultaneously lowered with respect to said egg lifters and eggs, said egg lifters simultaneously unwedging the eggs from said receiving pockets and raising them sufficiently so that they may engage into said supporting pockets.

4. The structure of claim 3 and in which the egg supporting pockets are resiliently expandable to clamp the eggs therein.

References Cited in the file of this patent

UNITED STATES PATENTS

| | | |
|---|---|---|
| 755,640 | Drake | Mar. 29, 1904 |
| 1,110,256 | Dalgleish | Sept. 8, 1914 |
| 1,227,224 | Voorhorst | May 22, 1917 |
| 1,846,866 | Hauk | Feb. 23, 1932 |
| 2,074,383 | Funk | Mar. 23, 1937 |
| 2,366,886 | Van Tuyl | Jan. 9, 1945 |
| 2,386,076 | Taylor | Oct. 2, 1945 |
| 2,410,163 | Howard | Oct. 29, 1946 |
| 2,666,665 | Whitcher et al. | Jan. 19, 1954 |

FOREIGN PATENTS

| | | |
|---|---|---|
| 659,226 | Great Britain | Oct. 17, 1951 |